Jan. 17, 1961
C. PREUSS
2,968,568
METHOD FOR THE TREATMENT OF PRODUCE
Filed Oct. 29, 1956
2 Sheets-Sheet 1
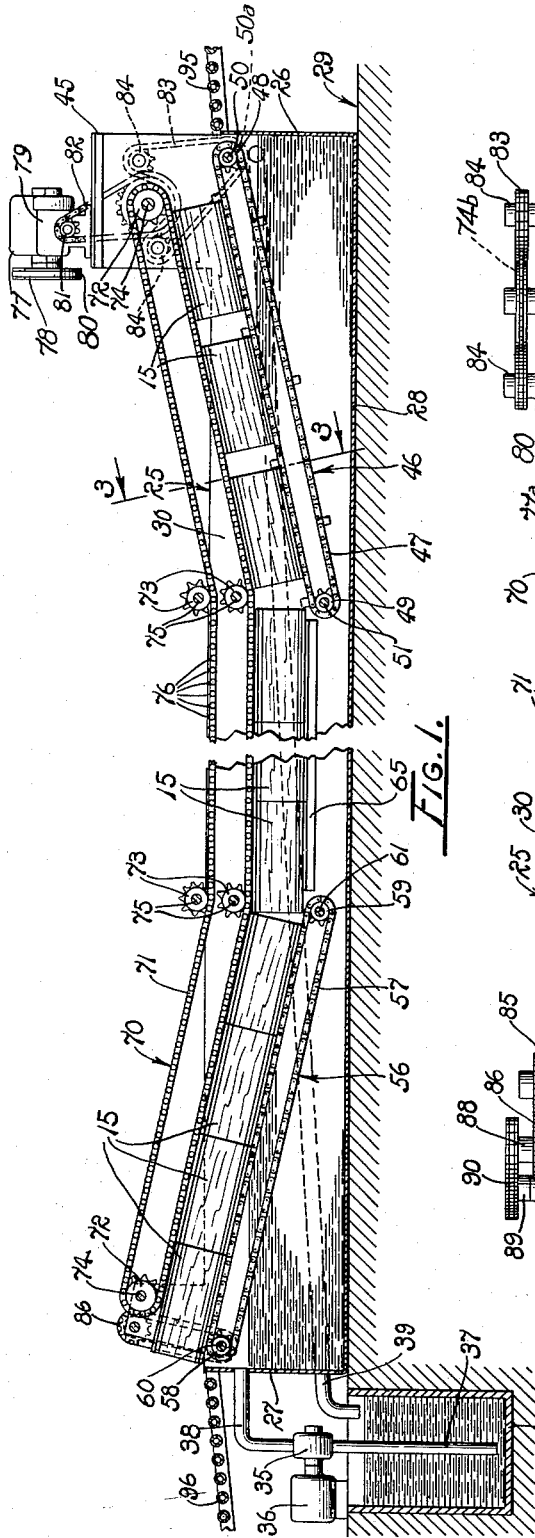
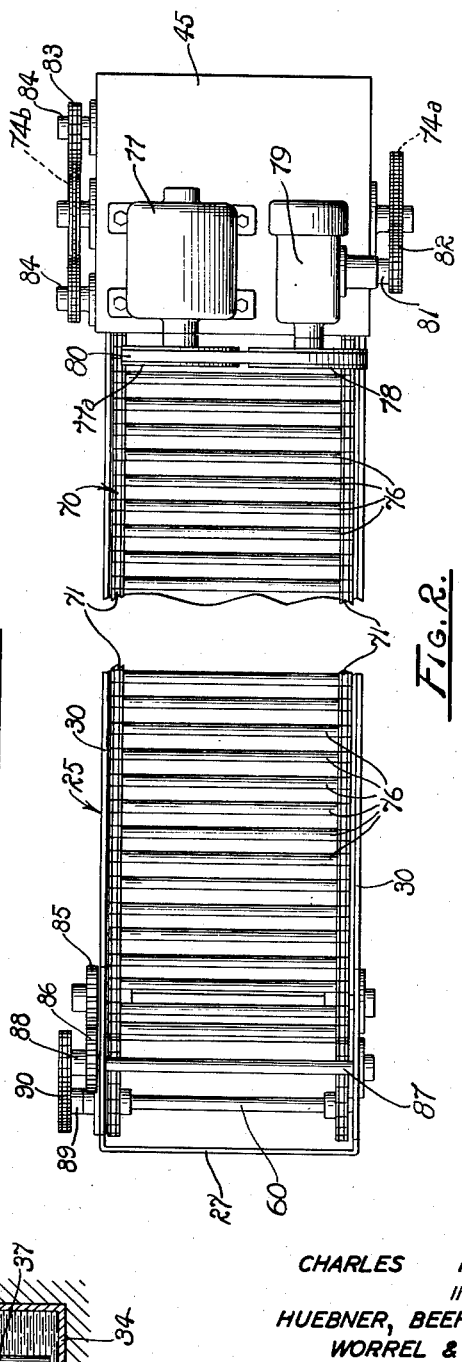
CHARLES PREUSS
INVENTOR
HUEBNER, BEEHLER,
WORREL & HERZIG
ATTORNEYS
BY Richard M. Worrel Jan. 17, 1961

C. PREUSS 2,968,568

METHOD FOR THE TREATMENT OF PRODUCE

Filed Oct. 29, 1956

CHARLES PREUSS
INVENTOR
HUEBNER, BEEHLER,
WORREL & HERZIG
ATTORNEYS

United States Patent Office 2,968,568
Patented Jan. 17, 1961

2,968,568

METHOD FOR THE TREATMENT OF PRODUCE

Charles Preuss, 8690 Minnewawa, Clovis, Calif.

Filed Oct. 29, 1956, Ser. No. 618,947

6 Claims. (Cl. 99—193)

The present invention relates to a method and apparatus for treating produce and more particularly to an improved method and apparatus for preserving produce immediately after it is harvested.

The subject invention is conveniently described in connection with the treatment of fresh peaches but the following description will evidence its suitability to many types of produce. At the time peaches are picked from the tree they are usually quite warm. Through research it has been discovered that every hour which elapses between the time that the peaches are picked and when they are chilled to the proper preservation temperature results in a day less that the peaches can be maintained as fresh fruit. That is, fruit that takes five hours to chill after having been picked can be maintained in marketable condition approximately two days less than fruit which is chilled in three hours after picking. Since fresh fruit usually must be transported considerable distances to market, a few days additional maintenance in marketable condition can make the difference between marketing success and failure. As is well known, the fruit is subject to spoilage due to certain bacterial and enzymatic actions occurring in the fruit both of which are greatly retarded at low temperatures. It is thus very important to remove as much heat as possible from the fruit as rapidly as possible after being picked.

In the past it has been known to pick fruit and have it in the field overnight to cool prior to shipment. At best this is a very uncertain and slow method of partially removing the excess heat. It has also been the practice to pick the fruit and subsequently to refrigerate it. However, with normal air refrigeration, it has taken from 24 to 36 hours to reduce the fruit temperature sufficiently for proper maintenance. It has long been evident that a more rapid cooling process is desirable.

The natural dehydration and shrinkage of fruit after being picked has also presented certain problems. For example, during the first eight hours after picking, peaches normally lose approximately two percent of their weight due to dehydration. This results in loss of flavor, deterioration in appearance and otherwise impairs the quality of the fruit.

Accordingly, it is an object of this invention to provide an improved method and apparatus for preserving produce.

Another object is to cool produce in an improved manner.

Another object is to remove the orchard heat from produce economically and more rapidly than heretofore deemed practical.

Another object is to minimize natural dehydration and shrinkage of produce during storage and/or shipment to market.

Another object is to maintain fruit stems moist while the fruit is in packed condition.

Another object is to enable the cooling of produce after being packed by immersion in a fluid bath whereby the produce is packed in an improved manner after removal from the bath.

Another object is to enable the cooling of a pack of produce without damage to the produce.

Other objects are to provide a method and apparatus which are simple to carry out and to construct, dependable in action, adaptable to various fruits and vegetables, and which is highly effective for accomplishing its intended purposes.

These together with other objects will become apparent upon reference to the following description.

In the drawings:

Fig. 1 is a side elevation, partially in section, of an apparatus employed in carrying out the method of the present invention.

Fig. 2 is a somewhat enlarged top plan view of the apparatus of Fig. 1 but having a central portion thereof broken away for illustrative convenience.

Figure 3:
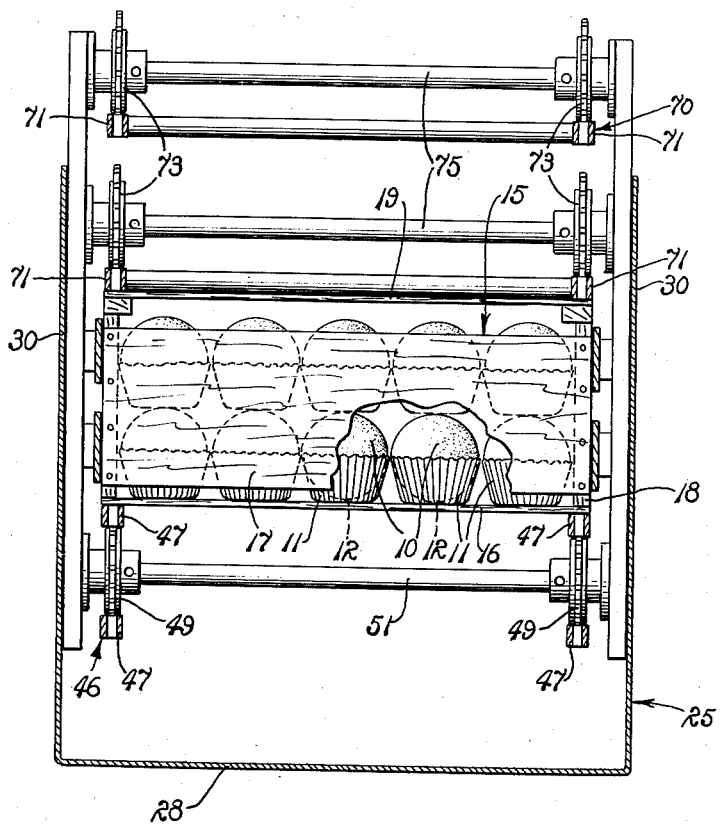
Fig. 3 is a somewhat enlarged transverse vertical section taken on line 3—3 of Fig. 1 and illustrating the manner in which produce treated by following the principles of the present invention is packed.

The method of the subject invention is best understood by reference to the accompanying drawings. As soon as the peaches 10 have been picked from the tree, they are placed in individual cups 11 with their stem ends 12 rested downwardly in the cups, as best seen in Fig. 3. These cups are of economical, flexible, water-proofed material, waxed paper being popular for the purpose. The cups of peaches are arranged in a lug box 15, or other container, having a bottom wall 16, end walls 17, slatted side walls 18, and a slatted lid 19. The cups of peaches are stacked in the box in layers with the cups in each layer being arranged in rows transversely and longitudinally of the box. Two such layers are shown in Fig. 3 but obviously the invention is not limited to such number. Also, the cups in the uppermost layer are rested on peaches in correspondingly positioned cups in the lower layer. Sometimes, fiberboard dividers are utilized between the layers. It is significant to note that the peaches in the uppermost layer are spaced slightly from the lid 19. This spacing, however, is considerably less than the diameter of the peaches, as will be noted by reference to Fig. 3.

Considering now that apparatus employed in carrying out a portion of the method of this invention, attention is initially directed to Fig. 1 wherein an elongated open top tank 25 having opposite end walls 26 and 27, a bottom wall 28 rested on a floor 29, and side walls 30, are best shown. The tank contains water 32 at a temperature of about 35° F. The temperature of the water should at least be below approximately 42° F. or 43° F. and of course above freezing, from 33° F. to 37° F. being preferred. A sump 34 is mounted below the level of the floor at one end of the tank or at any other position in convenient relation to the tank. A pump 35 driven by a motor 36 has an inlet conduit 37 extended downwardly into the sump and an outlet conduit 38 extended into the tank. An overflow conduit 39 is downwardly inclined from the end of the tank opposite to the end mounting the outlet conduit 38 and is extended to the sump. It will be evident that the pump continuously supplies water to the tank, and the overflow conduit maintains the water at a predetermined level. In order to maintain the water in the tank in properly chilled condition, chunks of ice, not shown, are deposited in the sump, or any other suitable chilling means, such as a refrigeration system utilized to achieve the heat removal. The sump simply characterizes a convenient source of chilled water.

A support frame 45 is positioned within the tank 25 and mounts a lower downwardly inclined delivery conveyer 46 therein. The delivery conveyer has a pair of endless chains 47 extended around upper and lower sprockets 48 and 49, respectively, secured to shafts 50 and 51 journaled in the frame transversely of the tank. The lower conveyer thus has an upper end adjacent to the end wall 26 of the tank and a lower end immersed in the water 32 and is adapted to carry said boxes 15 of peaches 10 from the upper end downwardly into the water.

An upwardly inclined lower removal conveyor 56 also includes a pair of chains 57 extended around upper and lower sprockets 58 and 59 secured to shafts 60 and 61 journaled in the support frame 45 transversely of the tank 25. The removal conveyer has a lower end immersed in the water 32 and longitudinally spaced from the lower end of the delivery conveyer 46. Also, the removal conveyer has an upper end positioned adjacent to the end wall 27 of the tank. A substantially horizontal lower guide platform 65 is mounted in the tank, in the support frame 45 and is extended longitudinally between the lower ends of delivery and removal conveyers to which more detailed subsequent reference will be made. The platform is positioned to receive the boxes 15 from the delivery conveyer end and to guide and transfer such boxes to the removal conveyer. The guide platform is immersed in the water at a depth somewhat greater than the height of the boxes so that when the boxes are held against the platform, they are completely immersed in the water.

An upper hold-down conveyer 70 is also provided including a pair of chains 71 mounted for circuitous travel on end sprockets 72 and intermediate sprockets 73. The end sprockets are secured to shafts 74 journaled in the support frame 45 transversely of the tank, and the intermediate sprockets are secured to shafts 75 likewise journaled in the support frame. The upper conveyer has a downwardly inclined delivery section, a horizontal intermediate section and an upwardly inclined removal section in spaced substantially parallel relation to the delivery conveyer 46, the guide platform 65, and the removal conveyer 56, respectively. The upper conveyer has a plurality of cleats 76 transversely interconnecting the chains. The lower run of the upper conveyer is spaced from the delivery conveyer, the removal conveyer, and the platform by a distance substantially equal to the height of the boxes 15 so that the cleats frictionally engage the lids 19 of the boxes.

A drive motor 77 is mounted in the support frame 45 and has an output pulley 77a connected to an input pulley 78 of a gear box 79 by a pulley belt 80. The gear box is mounted in the support frame and has an output drive sprocket 81 connected thereto. A chain 82 extends around the drive sprocket 81 and a driven sprocket 74a on one of the shafts 74. Drive is transmitted from a sprocket 74b on the same shaft 74 to a sprocket 50a on shaft 50 for the delivery conveyer 46. The drive is effected by another chain 83 in mesh with said sprockets 74b and 50a and extended around a pair of idler sprockets 84 journaled for rotation in the support frame. A drive gear 85 is secured to an end of the shaft 74 above the removal conveyer 56 and is in mesh with a reduction gear 86 journaled for rotation in the frame on a shaft 87. A sprocket 88 on the shaft 87, a sprocket 89 secured to the shaft 60 for the removal conveyer, and a chain 90 extended around the pulleys provides drive for the removal conveyer.

The boxes 15 are carried to the delivery conveyer 46 by an input conveyer 95, and they are carried away from the removal conveyer 56 by an output conveyer 96.

*Operation*

The operation of the apparatus and the performances of the method of the present invention is believed to be readily understood and briefly summarized at this point.

After the peaches 10 are picked, they are packed in lug boxes 15 in the manner described. The boxes are placed on the input conveyer 95 and transported to the delivery conveyer 46. Water 32 is supplied to the tank 25 by operation of the pump 35 and is maintained at a temperature of approximately 35° F.

The boxes 15 rest on the chains 47 of the delivery conveyer 46 and are thus carried downwardly toward the platform 65. The cleats 76 of the upper conveyer 70 engage the lids 19 of the boxes and also urge the boxes downwardly while holding them against the delivery conveyer and precluding uncontrolled gravitational sliding. It is to be observed that the delivery and removal conveyers and the upper conveyer 70 are traveling at the same rate of speed. The boxes are gradually immersed in the water 32 as they approach the lower end of the delivery conveyer and are then transferred on to the platform 65. At this point the boxes are completely immersed in water and tend to float upwardly. However, the cleats 76 engaging the boxes hold them downwardly against the platform or in fixed closely spaced relation to the platform. The cleats also function to move the boxes along the platform toward the removal conveyer 56.

While immersed in the water 32, the peaches 10 float upwardly within their boxes 15. The peaches in the uppermost layer engage the lid 19 and permit the peaches in the lower layer to rise a corresponding amount. The peaches do not actually leave their individual cups 11 but merely are gently buoyed therein as water enters the cups.

The upper conveyer 70 moves the boxes 15 onto the removal conveyer 56 where the upper conveyer and the removal conveyer 56 carry the boxes upwardly out of the water 32. As the boxes leave the water, the peaches 10 settle downwardly into their respective cups 11 and the cups and peaches settle back into their initially packed positions. Because of the gradual ascent of the boxes, the peaches are very gently and delicately repacked in a manner so soft and easy that any undue pressures on the fruit incident to even the most careful manual packing are relieved. The stem ends 12 rest downwardly in water which has entered the cups. Thus, the stems receive moisture which is absorbed by the fruit to maintain it in moistened condition for an extended period of time much in the manner of a picked flower receiving sustaining water from a vase. There is this marked difference, however. Prior to the present invention it was believed that any surface moisture whatsoever on fruit being packed was absolutely fatal to the preservation of fresh fruit for any appreciable period. The broad essence of the present invention resides in the discovery that chilled water on the surface of the fruit actually has a beneficial effect even in such quantities as are retained by the filled cups. It will, of course, also be understood that the peaches 10 are removed from their stems when picked and thus have no stems for the absorption of water from the cups. However, the removal of the stems leaves the stem sockets, the walls of which, it is discovered, are effective in drawing water from the cups into the fruit to sustain the fresh condition desired.

The speed of the conveyers 46, 56, and 70 is such that the boxes 15 of peaches 10 remain in the water 32 for at least about 20 minutes during which time they lose heat to the extent of approximately 40 to 50 degrees Fahrenheit. It has been found that in normal air refrigeration conventionally employed to chill fruit it takes 24 to 36 hours to obtain an equivalent temperature reduction. Bearing in mind that each hour saved in properly chilling fruit adds approximately a day to the marketable life of the fruit if it is maintained in chilled condition, the significance of the described process will be readily appreciated.

From the removal conveyer 56 the boxes are passed onto the output conveyer 96. The cooled and dripping wet peaches are then taken from the output conveyer and placed in refrigeration for storage and/or shipment to market. The peaches are preferably maintained at a temperature of from approximately 33° F. to approximately 43° F.

It has been found that the water in the cups 11 keeps the stem ends of the peaches moist and the peaches actually continue to increase in size rather than to lose weight due to dehydration and shrinkage. Peaches treated by the method of the present invention are packed in an improved manner by the gentle nestling back into the cups upon emergence from the tank 25, are cooled quickly to increase the preservation time, have a period following immersion during which they actually gain weight and improve in physical condition and crispness, and are maintainable in good marketable condition for actually multiples of the maximums achieved by prior commercial practices.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent methods, devices and apparatus.

Having described my invention, what I claim as new and desire to secure by Letters Patent is:

1. A process for maintaining the fresh qualities of peaches having stem ends comprising chilling the peaches by immersing them in chilled water, and thereafter storing the peaches under refrigeration with the stem ends thereof immersed in chilled water and the remainder thereof extended from the chilled water.

2. A process for maintaining the fresh qualities of peaches having stem ends comprising chilling the peaches by contact with chilled water, and thereafter maintaining the peaches under refrigeration with their stem ends immersed in chilled water, the remainder of their surface area exposed to the atmosphere, and with surface water remaining on said exposed area.

3. A process for preserving the fresh qualities of peaches having stem ends comprising chilling the peaches by subjection to contact with chilled water at a temperature of from about 33° F. to 43° F., and thereafter storing the peaches with the stem ends thereof immersed in water and at an environmental temperature of from about 33° F. to 43° F.

4. A process for preserving fresh peaches having stem ends for increased periods in marketable condition comprising removing field heat from the peaches by immersing the peaches in chilled water having a temperature of from 33° F. to 43° F. for a period of approximately twenty minutes, and storing the peaches at a temperature of from approximately 33° F. to 43° F. with the stem ends thereof immersed in water.

5. A process for maintaining the fresh qualities of peaches having stem ends comprising packing the peaches in individual cups with their stem ends downwardly disposed, immersing the cups and their peaches in a bath of chilled water whereby the peaches are cooled and chilled water enters the cups, removing the cups and their peaches from the bath with the cups retaining quantities of chilled water, and thereafter refrigerating the peaches with their stem ends immersed in the chilled water retained in the cups.

6. A process for preserving the qualities of fresh peaches having stem ends and which retain appreciable heat after being harvested comprising placing the peaches in individual substantially waterproof cups with their stem ends downwardly disposed in the cups, placing the cups in closely nested relation in a porous container having a lid spaced upwardly from the peaches, immersing the container and peaches in chilled water for a period of at least about twenty minutes whereby the peaches are chilled and float upwardly in the cups to enable water to enter the cups, removing the container from the water whereby the peaches settle back into their respective cups with the stem ends thereof immersed in water remaining in the cups, and refrigerating the container of chilled peaches while said stem ends of the peaches remain immersed in the water retained in the cups.

References Cited in the file of this patent

UNITED STATES PATENTS

| | | |
|---|---|---|
| 1,384,311 | Follinger | July 12, 1921 |
| 1,480,607 | Ford | Jan. 15, 1924 |
| 1,617,630 | Gay | Feb. 15, 1927 |
| 1,716,712 | Stepick | June 11, 1929 |
| 1,961,337 | Cornell | June 5, 1934 |
| 2,182,927 | Matthews | Dec. 12, 1939 |
| 2,479,171 | Lamperti | Aug. 16, 1949 |

OTHER REFERENCES

"Ice and Refrigeration," vol. 62, No. 3, March 1922, pp. 238 and 239.